United States Patent Office 3,460,520
Patented Aug. 12, 1969

3,460,520
FUEL INJECTION SYSTEM FOR INTERNAL-COMBUSTION ENGINES
Robert Huber, Zumikon, Switzerland, assignor to Societe des Procedes Modernes d'Injection Sopromi, Les Mureaux, Yvelines, France, a corporation of France
Filed Apr. 7, 1967, Ser. No. 629,190
Claims priority, application Switzerland, Apr. 14, 1966, 5,374/66
Int. Cl. F02m *51/00, 63/02*
U.S. Cl. 123—32      5 Claims

ABSTRACT OF THE DISCLOSURE

A single fuel metering valve is provided to control the injection of fuel into a plurality of cylinders in an internal-combustion engine. A plurality of fuel injection nozzles are each coupled between the outlet of the fuel metering valve and the air intake conduit of a corresponding cylinder. An electrical control circuit is coupled between the crankshaft of the motor and the fuel metering valve to control the timing and the quantity of fuel injected into the air intake conduits through the fuel injection nozzles. The fuel injection nozzles can be electromagnetically actuated valves which are opened in sequence during the intake stroke of the corresponding cylinders. A fuel distributor can also be connected between the fuel metering valve and the injection nozzles to couple the fuel injection nozzles to the outlet of the fuel metering valve in time sequence.

BACKGROUND OF THE INVENTION

This invention relates to a fuel injection system for injecting fuel into the air intake conduits of an internal-combustion engine having a plurality of cylinders. Fuel injection systems of this type are known which contain mechanically driven single or multipiston pumps for injecting a precisely measured quantity of fuel under pressure directly or via a distributor into the cylinders of an engine through injection nozzles mounted on the air intake conduits. Such piston pumps, however, must be manufactured with great precision and are therefore very expensive. They are furthermore not well suited for high-speed engines.

A fuel injection system is also known in which fuel is injected by means of a single injection nozzle into the intake manifold of an internal-combustion engine. In this case, however, there is a continuous injection which is not controlled to coincide with the operating cycle of the engine.

It is also known to dispose an electrically operated fuel injection nozzle on the air intake conduit of each cylinder, which nozzle injects fuel applied thereto under pressure from a pump in precisely measured quantities into the air intake conduit. In this system, however, the number of electrical fuel injection nozzles has to be equal to the number of cylinders in the engine, which also becomes very costly. It is further difficult with these individual fuel injection nozzles to produce exactly the same amount of injected fuel for all of the cylinders.

SUMMARY OF THE INVENTION

It is the object of the present invention to provide a fuel injection system for internal-combustion engines which is significantly cheaper to produce than the above-noted prior art systems and which provides a more equal distribution of the fuel injected into the individual cylinders.

The fuel injection system according to the present invention is characterized by a single fuel metering valve which controls the amount of fuel injected into all of the cylinders of an internal-combustion engine in synchronism with the operating cycle of the engine. The fuel is brought to the fuel metering valve from a fuel pump, and the fuel metering valve is coupled via fuel lines to fuel injection nozzles communicating through the air intake conduits in front of the intake valves for the cylinders.

DESCRIPTION OF THE PREFERRED EMBODIMENTS

Figure 1:
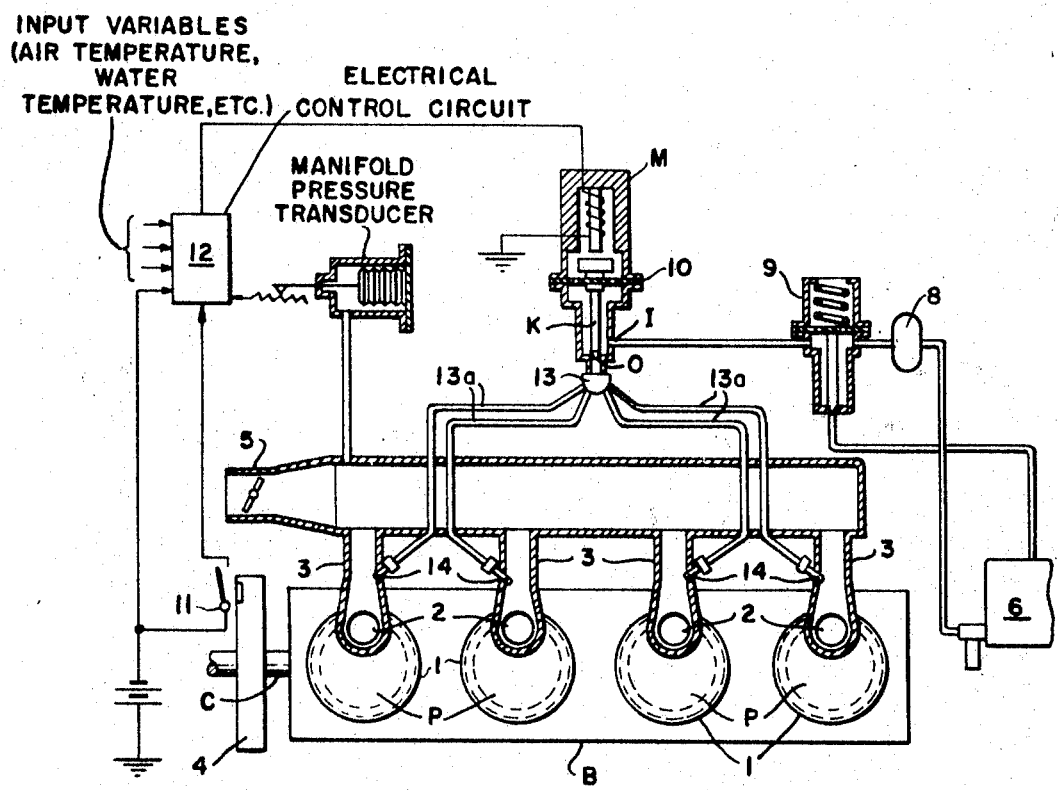
FIGURE 1 is a schematic representation of a first embodiment of a fuel injection system of this invention in which all of the fuel injection nozzles are simultaneously connected with the metering valve.

In FIGURE 1, a four-cylinder internal-combustion engine is represented schematically by an engine block B, four cylinders 1 formed in block B, an intake valve 2 for admitting an air-fuel mixture into each of the cylinders 1, an air intake conduit 3 communicating with the intake valve 2 of each cylinder 1, an intake manifold 5 connected to each of the air intake conduits 3, a piston P slidably mounted within each of the cylinders 1, and a crankshaft C connected to all of the pistons P to be driven thereby. Since the detailed structure and operation of internal-combustion engines are well known in the art, and since this invention relates to the fuel injection system for the above-noted engine rather than to the engine itself, no further description will be given for the engine per se.

In the fuel injection system shown in FIGURE 1, fuel is pumped by a fuel pump 7 from a fuel container 6 to a pressure pump 8 and subsequently flows, under pressure, via a pressure regulating valve 9 to an electromagnetic fuel metering valve 10. The fuel metering valve 10 contains an inlet I, an outlet O, a control member K for controlling the flow of fuel from the outlet O, and an electromagnet M for controlling the position of control member K. The outlet O of valve 10 is opened at least once durin geach revolution of crankshaft C by means of a cam disc 4 which is mechanically or magnetically coupled to a switch 11. The closing of switch 11 applies a pulse to an electrical control circuit 12, which in turn applies a pulse to electromagnet M to lift control member K and open the outlet O of fuel metering valve 10. The amount of fuel injected by the opening of outlet O is determined by the length of time that it is opened, which time length is variable by means of the duration of the output pulse from control circuit 12. Control circuit 12 varies the length of its output pulse in accordance with intake manifold pressure, and other factors such as air temperature and cooling water temperature to compensate for changes in these variables. Since the detailed circuit elements which form control circuit 12 are well known in the art, they are not disclosed in detail in the drawings.

The fuel which is metered out through outlet O of fuel metering valve 10 is transmitted via a fuel distributor 13 and fuel lines 13a to fuel injection nozzles 14, each of which communicates into a corresponding air intake conduit 3. In this embodiment, the fuel is injected simultaneously into all of the air intake conduits 3, and is drawn into the corresponding cylinder 1 when the intake valve 2 thereof is opened during the intake stroke thereof.

Figure 2:
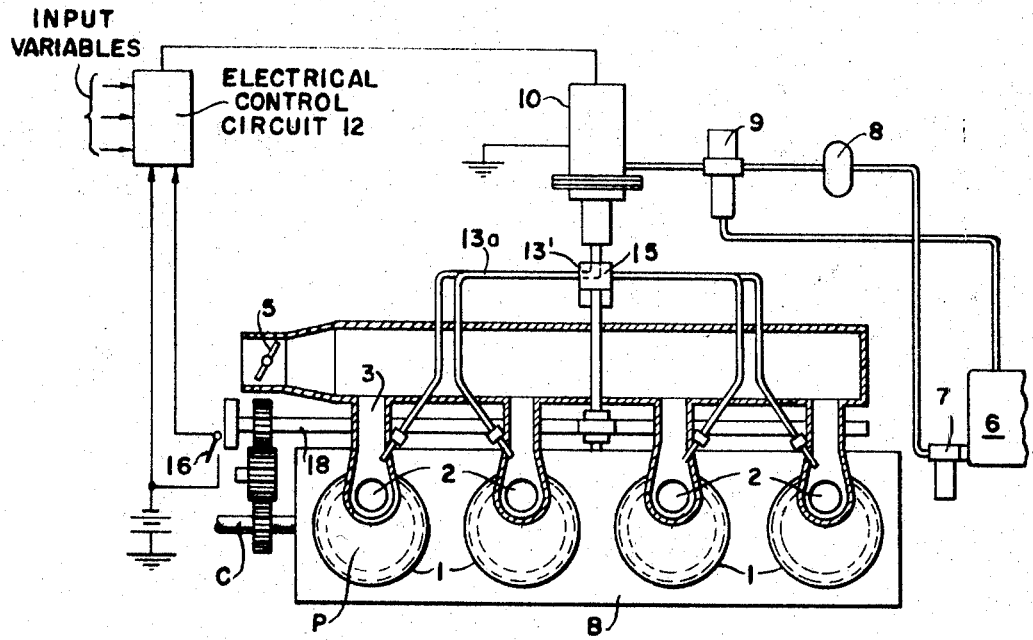
FIGURE 2 is a schematic representation of a modification of the embodiment of FIGURE 1 including a distributor driven by the engine.

In the modification shown in FIGURE 2, however, the injection does not occur simultaneously but rather in the sequence of ignition, namely during the intake stroke for each cylinder. This is accomplished by a rotary member 15 within fuel distributor 13', the rotary member 15 having a passageway therethrough, as indicated by the dashed lines, for selectively coupling the outlet of valve 10 to only one of the fuel lines at a time in sequence depending on its rotary position. The rotary member 15 is rotated in synchronism with crankshaft C by a camshaft 18 which is coupled thereto via a gear train, which camshaft 18 also actuates a switch 16 to trigger control circuit 12 in synchronism with crankshaft C and rotary member 15.

The injection process is initiated four times during one revolution of the camshaft 18 by switch 16, whose opening and closing times are set to fall within the time period during which the rotary member 15 is aligned with one of the feed lines 13a, so that the injection action will not occur when the rotary member 15 is passing from one feed line 13a to the next. In this embodiment, the timing of switch 16 and rotary member 15 is preferably synchronized so that the injection period for each cylinder will occur during the intake stroke for that cylinder.

Figure 3:
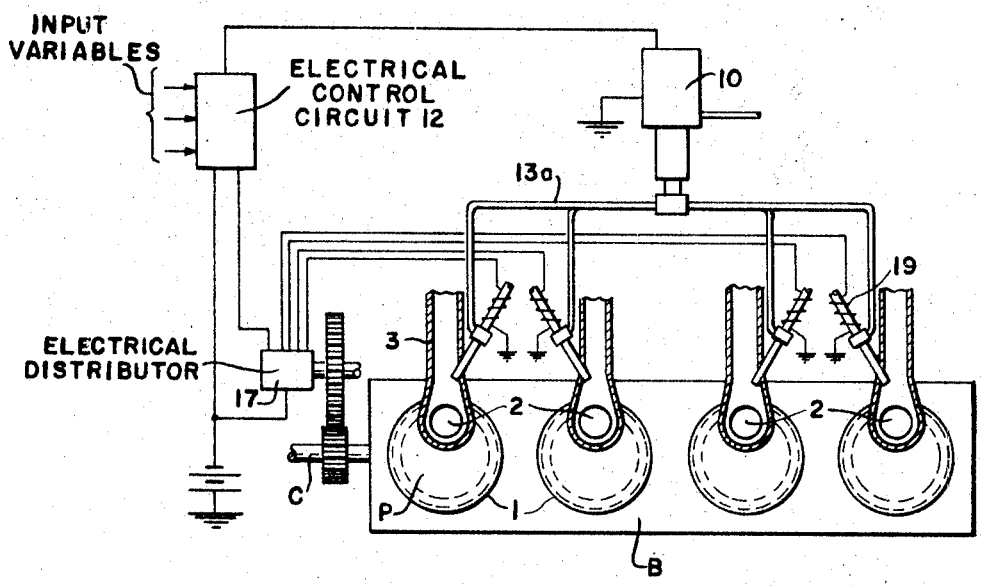
FIGURE 3 is a schematic representation of an embodiment in which the injection of fuel into the individual air intake conduits is accomplished by electromagnetically operated valves.

In the emodiment shown in FIGURE 3, the injection nozzles consist of normally closed, magnetically operated valves 19 which are opened in sequence of ignition by means of electric pulses and are kept open until the injection action is completed. The pulses are distributed to the individual valves 19 by an electrical distributor 17 which is driven by the camshaft C. Electrical distributor 17 also produces the triggering pulses for electrical control circuit 12.

The embodiments shown in FIGURES 2 and 3 require fast-acting metering valves because with a fast-running four-cylinder engine, which, e.g., reaches 6000 r.p.m., a maximum time of only $5 \times 10^{-3}$ seconds is available for each injection period. Two metering valves are required for a six- or eight-cylinder engine, each metering valve being associated with three or four cylinders.

In comparison with the known fuel injection systems in which the metering of the fuel quantity for each cylinder occurs separately by individually magnetically controlled injection valves, which individual valves must all possess exactly the same characteristics, the fuel injection system of this invention has the advantage that only one, or with more than four cylinders according to FIGURES 2 and 3, at most two metering valves are required. Thus, the fuel injection system of this invention not only provides a more equal distribution of fuel to the individual cylinders, but also provides a substantial reduction in cost by substantially reducing the number of precision components required in the system.

I claim:

1. In an internal-combustion engine including a plurality of cylinders each having an intake valve for admitting an air-fuel mixture thereinto, a plurality of air intake conduits each communicating with the intake valve of a corresponding cylinder plurality of pistons each slidably mounted in a corresponding one of said cylinders, and a common crankshaft coupled to all of said pistons to be driven thereby, a fuel injection system comprising, in combination:
  (a) a fuel pump having a fuel outlet for delivering fuel to the outlet at a predetermined pressure;
  (b) a fuel metering valve having a fuel inlet, a fuel outlet, and a control member for controlling the flow of fuel from said fuel outlet, said control member being operable to open and to close said fuel metering valve whereby the quantity of fuel injected is determined by the time period during which said fuel metering valve is opened by said electrical control means;
  (c) means for connecting the outlet of said fuel pump to the inlet of said fuel metering valve;
  (d) a plurality of fuel injection nozzles each communicating into a corresponding one of said air intake conduits for injecting fuel thereinto;
  (e) means for successively opening and closing communication between the outlet of said fuel metering valve and the outlets of each of said fuel injection nozzles in time sequence with the intake stroke of the corresponding cylinder and the flow of fuel from the outlet of said fuel metering valve such that the quantity of fuel determined by the pressure of the system and the time period of the valve flows out of the outlet of one nozzle while no fuel flows out of the other nozzle outlets; and
  (f) electrical control means coupled between said crankshaft and the control member of said metering valve for controlling the timing and the amount of fuel injected into said air intake conduits through said fuel injection nozzles.

2. A fuel injection system as defined in claim 1 wherein said means for connecting each of said fuel injection nozzles to the outlet of said fuel metering valve includes a fuel distributor connected between the outlet of said fuel metering valve and said fuel injection nozzles.

3. A fuel injection system as defined in claim 1 wherein said fuel injection nozzles each comprise a normally closed electromagnetically actuated valve, and said means for connecting each of said fuel injection nozzles to the outlet of said fuel metering valve includes electrical control means coupled between said crankshaft and said electromagnetically actuated valves to open each of said electromagnetically actuated valves in time sequence during the intake stroke of the corresponding cylinder.

4. In an internal-combustion engine including a plurality of cylinders each having an intake valve for admitting an air-fuel mixture thereinto, a plurality of air intake conduits each communicating with the intake valve of a correspondnig cylinder, a plurality of pistons each slidably mounted in a corresponding one of said cylinders, and a common crankshaft coupled to all of said pistons to be driven thereby, a fuel injection system comprising, in combination:
  (a) a fuel pump having a fuel outlet;
  (b) a fuel metering valve having a fuel inlet, a fuel outlet, and a control member for controlling the flow of fuel from said fuel outlet;
  (c) means for connecting the outlet of said fuel pump to the inlet of said fuel metering valve;
  (d) a plurality of fuel injection nozzles each communicating into a corresponding one of said air intake conduits for injecting fuel thereinto;
  (e) means for connecting each of said fuel injection nozzles to the outlet of said fuel metering valve including a fuel distributor connected between the outlet of said fuel metering valve and said fuel injection nozzles, said fuel distributor including rotary means for connecting each of said injection nozzles to the outlet of said fuel metering valve in time sequence, and means coupled between said crankshaft and said rotary means for driving said rotary means in synchronism with said crankshaft; and (f) electrical control means coupled between said crankshaft and the control member of said metering valve for controlling the timing and the amount of fuel injected into said air intake conduits through said fuel injection nozzles.

5. A fuel injection system as defined in claim 4 wherein said rotary means connects the outlet of the fuel metering valve with the injection nozzle of each cylinder during its intake stroke, the injection action for each cylinder being initiated and terminated by said electrical control means within the time period of the intake stroke for the corresponding cylinder.

References Cited

UNITED STATES PATENTS

| | | |
|---|---|---|
| 2,941,524 | 6/1960 | Aldinger et al. |
| 2,943,614 | 7/1960 | Bosch et al. |
| 2,982,276 | 5/1961 | Zechnall et al. _____ 123—119 |
| 2,992,640 | 7/1961 | Knapp _____ 123—119 |
| 3,051,152 | 8/1962 | Paule et al. _____ 123—119 |
| 3,319,613 | 5/1967 | Begley et al. _____ 123—119 |

LAURENCE M. GOODRIDGE, Primary Examiner

U.S. Cl. X.R.

123—119, 139